United States Patent [19]

Inaba et al.

[11] 4,430,923

[45] Feb. 14, 1984

[54] WRIST MECHANISM IN AN INDUSTRIAL ROBOT

[75] Inventors: Hajimu Inaba; Susumu Ito, both of Hino, Japan

[73] Assignee: Fujitsu Fanuc Limited, Tokyo, Japan

[21] Appl. No.: 267,573

[22] Filed: May 27, 1981

[30] Foreign Application Priority Data

Jun. 4, 1980 [JP] Japan .................................. 55-74162

[51] Int. Cl.³ .......................... F15B 13/06; F15B 21/02
[52] U.S. Cl. .............................................. 91/61; 91/36; 91/189 R; 91/398; 91/530; 92/165 PR
[58] Field of Search ............... 92/2; 91/358 R, 358 A, 91/362, 363 R, 189 R, 398, 35, 36, 530, 61

[56] References Cited

U.S. PATENT DOCUMENTS

| | | | |
|---|---|---|---|
| 3,620,132 | 11/1971 | Nitkiewicz | 92/2 |
| 4,235,155 | 11/1980 | Shofer | 91/361 |
| 4,274,802 | 6/1981 | Inaba et al. | 414/783 |

FOREIGN PATENT DOCUMENTS

52-24678 2/1977 Japan ......................................... 92/2

*Primary Examiner*—Paul E. Maslousky
*Attorney, Agent, or Firm*—Armstrong, Nikaido, Marmelstein & Kubovcik

[57] ABSTRACT

A wrist mechanism in an industrial robot comprises a wrist, a rotary type actuator which is rotatable in clockwise and counter-clockwise directions, a first positioning board which can define arbitrary angular stopping positions, sensing devices, and a second positioning board which is arranged facing the first positioning board, wherein the sensing devices detect the angular position of the wrist, which is driven by the rotary type actuator, the rotary type actuator is stopped by signals produced by the sensing devices, and the second positioning board with tapered receptacles is pressed to the first positioning board with tapered pins, whereby the positioning of the wrist mechanism is carried out.

1 Claim, 4 Drawing Figures

WRIST MECHANISM IN AN INDUSTRIAL ROBOT

BACKGROUND OF THE INVENTION

1. Field of the Invention

The present invention relates to a wrist mechanism in an industrial robot, which is used, for example, to treat work piece materials for machine tools.

2. Description of the Prior Art

In one prior art device, a wrist mechanism in an industrial robot has been used in which the angular positioning for any desired position is carried out with a servo control device. However, the servo control device is very expensive; thus the servo control device has not been widely used in this field.

In another prior art device, a wrist mechanism in an industrial robot has been used in which the angular positioning is carried out with the angular positioning device for two positions. The device, for example, comprises a rotary type actuator having two air intakes. The rotor of the rotary type actuator rotates clockwise when the air pressure is applied to one of the air intakes and the rotor rotates counterclockwise when the air pressure is applied to the other air intake. A pawl is provided coaxially with the rotor of the rotary type actuator and stops the rotor at desired angular positions cooperating with stoppers, which are located on the outer portion of the stator of the rotary type actuator, so that the angular positioning of the wrist mechanism of an industrial robot, which is linked with the rotor of the rotary type actuator, is carried out. An angle between two stopping positions of the wrist mechanism is decided by the relation of the shape of the pawl and the positions of the stoppers.

In recent years, the necessity of various positions, for example, positions of angles of 0 degree, 90 degrees, 180 degrees and 270 degrees from the reference position, is required frequently because of applications in which the wrist mechanism has double grasping portions, the necessity of working both a front surface and a back surface, and the relations of the locations between the work and the work locating base or the work transferring device. For the above mentioned four positions, hitherto a wrist mechanism using the conventional servo controlled positioning was utilized, or two angular positioning devices for two positions was utilized, putting the devices one upon another. For these reasons, problems exist in the conventional wrist mechanisms, in that the cost of the wrist mechanism becomes very expensive and the wrist mechanism is not practical, because of the large size of the mechanism compared with the functions thereof. The wrist mechanism using the angular positioning device for two positions comprising the rotary type actuator was disclosed in U.S. Pat. No. 4,274,802, issued June 23, 1981, by the inventor of the present invention.

The present invention is proposed to solve the above mentioned problems in conventional wrist mechanisms.

SUMMARY OF THE INVENTION

The object of the present invention is to provide an improved wrist mechanism in which an angular multi-positioning is able to be carried out accurately and directly for predetermined angular positions.

According to the present invention, there is provided a wrist mechanism in an industrial robot comprising a wrist, a rotary type actuator rotatable in clockwise and counter-clockwise directions for actuating the wrist, a first positioning board having tapered pins and a projection, sensing devices associated with the projection, and a second positioning board having tapered receptacles for receiving the tapered pins, wherein the sensing devices are adapted to detect the angular position of the wrist, the rotary type actuator is adapted to be stopped by signals produced by the sensing devices, the second positioning board is adapted to be pressed to the first positioning board whereby the positioning of the wrist mechanism is carried out.

DESCRIPTION OF THE PREFERRED EMBODIMENT

Figure 1:
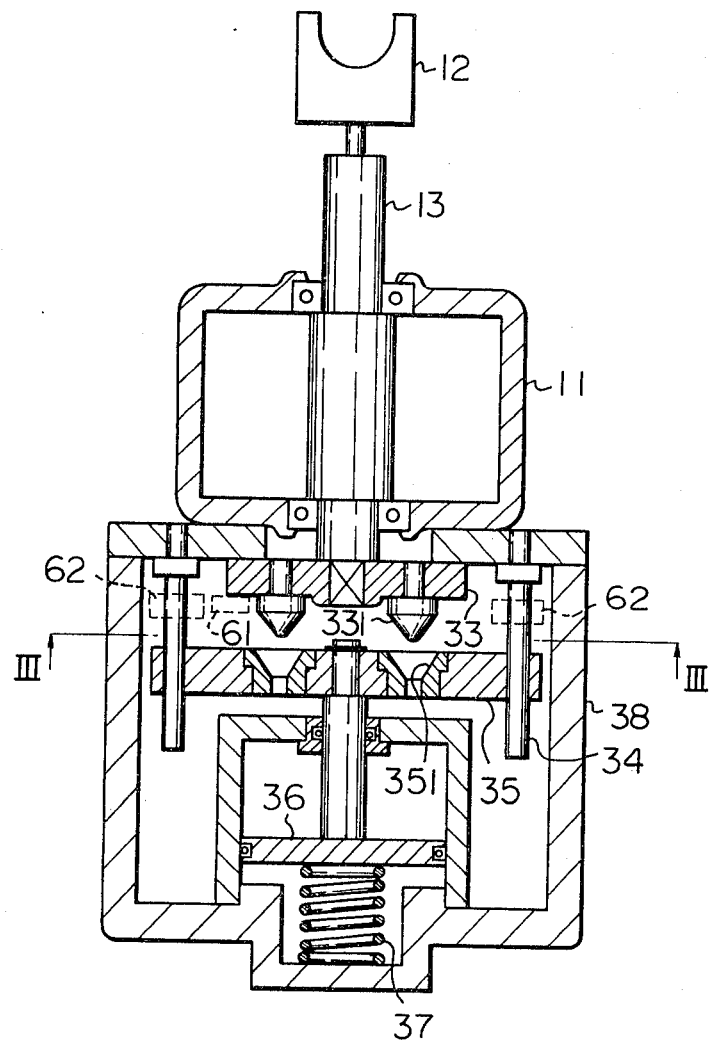
FIG. 1 is a cross-sectional view illustrating the construction of a wrist mechanism of an industrial robot according to an embodiment of the present invention.

FIGS. 1 through 4 are diagrams illustrating a wrist mechanism of an industrial robot according to an embodiment of the present invention. FIG. 1 is a cross-sectional view of the wrist mechanism. The wrist mechanism comprises a wrist 13, a rotary type actuator 11, a grasping member 12, a first positioning board 33, a second positioning board 35 with tapered receptacles 351, sensing devices 62, a piston 36 of air cylinder and a casing 38. The rotary type actuator may be a conventional one, has two compressed air intakes and a rotor, and can rotate the rotor either clockwise or counter-clockwise by the connection or disconnection of the compressed air to the intake pipes of the actuator. The rotary axis of the rotary type actuator 11 is coaxial with those of the grasping member 12, the wrist 13 and the first positioning board 33. The grasping member 12 is a member in which a material to be processed is grasped and in FIG. 1 a schematic representation of the grasping member 12 is shown.

Figure 3:
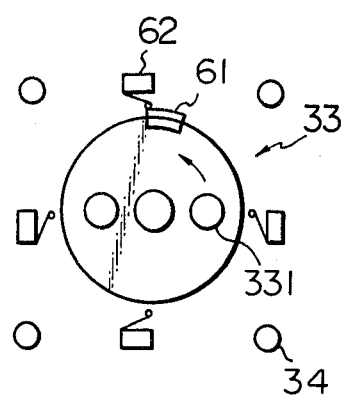
FIG. 3 is a fragmentary view taken in the direction of the arrows along the line III—III of FIG. 1.

The first positioning board 33 in the embodiment of the present invention, as shown in FIG. 3, is constructed with a circular plate, two tapered pins 331 peripheral projection 61. The tapered pins and the projection 61 are attached on the circular plate. The projection 61 is an actuator to switch on limit switches to supply signals of the angular positioning of the wrist mechanism.

Figure 2:
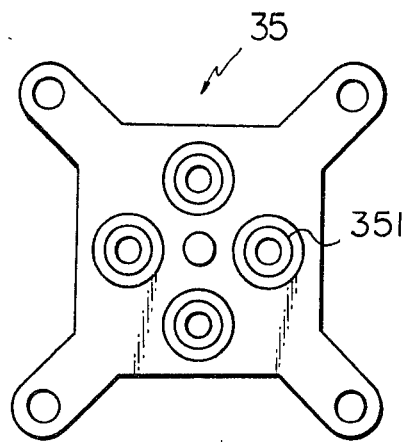
FIG. 2 is a plan view illustrating the construction of the second positioning board in the wrist mechanism of FIG. 1.

As shown in FIG. 1, the outer cylindrical portion of the rotary type actuator 11 is coupled to the casing 38 which accommodates the first positioning board 33 and the second positioning board 35. In addition, the casing 38 accommodates the guide pins 34, air pressing piston 36 by which the second positioning board 35 is pressed to slide along the guide pins, and a spring 37 which presses the second positioning board 35 to the first positioning board 33. FIG. 2 is a plan view of the second positioning board 35.

Figure 4:
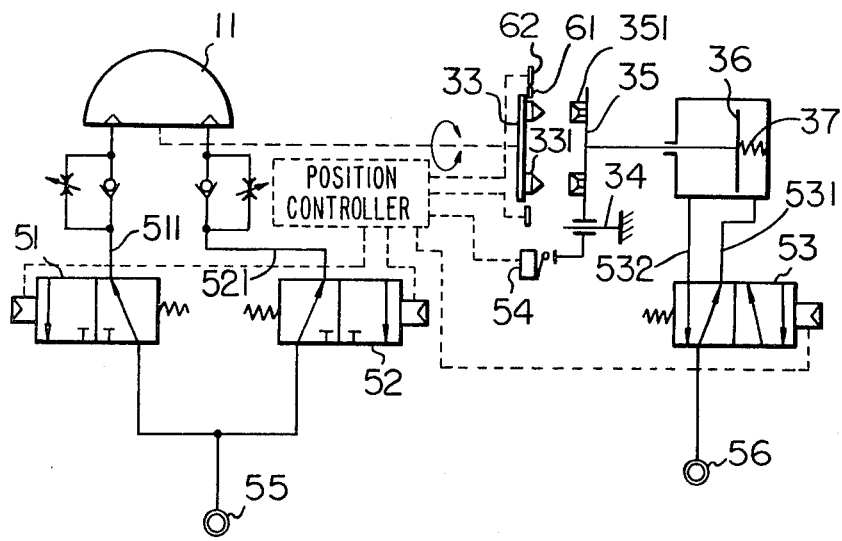
FIG. 4 is an operational diagram in the wrist mechanism of FIG. 1.

FIG. 4 is an operational diagram of the wrist mechanism, in which the position controller that electrically interconnects the mechanical elements of the invention is shown purely schematically. Each of the sensing devices or limit switches 62 is positioned within casing 38 to be engaged by projection 61 at a desired stopping position where the tapered pins 331 are alinged with a pair of the tapered receptacles 351, and another limit switch 54 is actuated by board 35 when it is moved to the left so that pins 331 are fully engaged into tapered receptacles 351.

In operation, the position controller operates the elements in the following sequence to move the wrist from a present position to a new position:

Step 1—magnetic valve 53 is energized to move to the left, disconnecting air pressure source 56 from line 531 and connecting it to line 532, thus applying pressure to the left side of piston 36 and moving it to the right on guide pins 34 against spring 37, thereby moving positioning board 35 away from board 33 to disengage receptacles 351 from pins 331.

Step 2—magnetic valve 51 is energized to move to the right, disconnecting air line 511 from air pressure source 55 and venting it to th atmosphere while air line 521 remains connected, allowing the rotary actuator to be operated by air pressure from source 55 through valve 52 and line 521.

Step 3—the position controller senses when the sensing device 62 for the desired position is actuated by projection 61, and energizes magnetic valve 52, moving it to the left. This disconnects air pressure source 55 from air line 521 and vents that line to the atmosphere, equalizing pressure in rotary actuator 11 and stopping it at that position.

Step 4—magnetic valve 53 is deenergized and returns to its original position as shown in FIG. 4, connecting air pressure from source 56 to line 531 and applying pressure to the right side of piston 36, which together with spring 37, moves piston 36 to the left and brings the tapered receptacles 351 on board 35 into engagement with tapered pins 331 on boards 33 to accurately position the wrist and hold it in that position.

Step 5—when board 35 is moved so that pins 331 are fully engaged in receptacles 351, switch 54 operates. The controller senses the concurrent operation of sensing elements 62 and switch 54, confirming accurate positioning of the wrist, and deenergizes magnetic valves 51 and 52, permitting them to return to their original positions, thereby preparing the system for the next cycle.

When the electric power is interrupted or the air pressure is decreased, the wrist does not rotate because the second positioning board 35 is pressed to the first positioning board 33 the spring 37 located in the air cylinder and held in this position.

Furthermore, in the present invention the wrist is movable directly to the desired position without stopping at any other positions as in the conventional mechanism. Thus the unnecessary action of stopping and starting on the way is not performed and wrist positioning is carried out quickly. Also, the angular positionings of the wrist mechanism is performed through the shortest course by being able to be moved either clockwise or counter-clockwise, which appropriate utilization prevents the twisting of the cables or air tubes by which the wrist mechanism is connected with power sources and so on.

We claim:

1. An industrial robot wrist mechanism positionable to a plurality of predetermined positions, comprising:
   a rotatable wrist member;
   a rotary actuator having a rotor movable about an axis under the influence of fluid pressure, said wrist member being fixed to said rotor for movement therewith;
   a casing affixed to said rotary actuator;
   a first board positioned within said casing and fixed to said rotatable member for rotation therewith, said first board having a pair of tapered pins extending axially therefrom and a peripheral projection extending laterally therefrom;
   a plurality of sensing devices fixed adjacent to said first board within said casing and arranged to detect a plurality of angular positions of said projection about said axis;
   a second board mounted to be rotatively fixed and axially movable within said casing, said second board being formed with a plurality of tapered receptacles arranged to receive said tapered pins in different rotational positions of said first board;
   a fluid operated piston connected to said second board and operable to move said second board axially with respect to said first board;
   a first magnetic valve for controlling fluid flow from a first source of fluid pressure to said piston, and second and third magnetic valves for controlling the fluid flow from a second source of fluid pressure to said rotary actuator;
   said valves being so connected that energization of said first magnetic valve will cause fluid from said first source to operate said piston to move said second board axially away from said first board and disengage said pins from said receptacles, whereafter energization of said second magnetic valve will allow fluid from said second source to operate said rotary actuator to rotate said rotor together with said wrist member and said first board until said projection is detected by a selected one of said sensing devices, whereupon energization of said third magnetic valve will disconnect said rotary actuator from said fluid source to cause said rotor to stop, and thereafter deenergization of said first valve will cause fluid from said first source to operate said piston axially to move said second board toward said first board and engage said tapered pins into a selected pair of said receptacles, whereby angular positioning of said wrist member is carried out.

* * * * *